US012800007B2

(12) United States Patent
Chen et al.

(10) Patent No.: US 12,800,007 B2
(45) Date of Patent: Nov. 17, 2026

(54) SPINDLE DEVICE WITH ADJUSTABLE DAMPING CHARACTERISTICS AND METHOD FOR ADJUSTING DAMPING CHARACTERISTICS THEREOF

(71) Applicant: INDUSTRIAL TECHNOLOGY RESEARCH INSTITUTE, Hsinchu (TW)

(72) Inventors: Lei-Yi Chen, Hsinchu (TW); Shao-Yu Hsu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 471 days.

(21) Appl. No.: 18/404,642

(22) Filed: Jan. 4, 2024

(65) Prior Publication Data

US 2025/0122919 A1 Apr. 17, 2025

(30) Foreign Application Priority Data

Oct. 11, 2023 (TW) ................................ 112138698

(51) Int. Cl.
*F16F 15/023* (2006.01)

(52) U.S. Cl.
CPC ...... *F16F 15/023* (2013.01); *F16F 2230/183* (2013.01); *F16F 2232/02* (2013.01)

(58) Field of Classification Search
CPC ... B23Q 11/0032; F16F 15/027; F16F 15/023; F16F 2230/183; F16F 2232/02
See application file for complete search history.

(56) References Cited

U.S. PATENT DOCUMENTS 3,058,559 A 10/1962 Ohrnberger
4,530,507 A 7/1985 Lee, Jr.
(Continued)

FOREIGN PATENT DOCUMENTS

CN 102151852 A 8/2011
CN 104728333 A 6/2015
(Continued)

OTHER PUBLICATIONS

Pollmann, E. et al., "Compressibility and inertia effects on the dynamic behaviour of recessed hydrostatic bearings," Tribology International, vol. 22, Issue 3, pp. 166-176 (Jun. 1989).
(Continued)

*Primary Examiner* — Alan Snyder
(74) *Attorney, Agent, or Firm* — Maschoff Brennan

(57) ABSTRACT

A spindle device includes a shaft housing, a spindle, a bearing liner, a damping adjustment piston and an actuating assembly. The spindle is disposed through the shaft housing. A bearing component surrounds a shaft. The bearing liner is sleeved on the bearing component and has a liner conical surface facing away from the bearing component. The liner conical surface is non-parallel to an axial direction. A damping chamber is formed between the shaft housing and the bearing liner to be filled with a damping fluid. The damping adjustment piston is slidably located within the damping chamber and has a piston conical surface facing the liner conical surface. The piston conical surface is non-parallel to the axial direction. The actuating assembly is to drive the damping adjustment piston to move relative to the bearing liner to adjust a gap formed between the piston conical surface and the liner conical surface.

20 Claims, 15 Drawing Sheets

(56) References Cited

U.S. PATENT DOCUMENTS

| | | | | |
|---|---|---|---|---|
| 4,560,289 | A | 12/1985 | Wood, III | |
| 5,215,384 | A * | 6/1993 | Maier | F16C 17/03 384/312 |
| 5,425,584 | A | 6/1995 | Ide | |
| 5,603,574 | A | 2/1997 | Ide et al. | |
| 6,637,942 | B2 * | 10/2003 | Dourlens | F16C 17/03 384/117 |
| 7,625,121 | B2 | 12/2009 | Pettinato et al. | |
| 8,485,909 | B2 | 7/2013 | Feldmeier | |
| 8,726,503 | B2 | 5/2014 | Pettinato et al. | |
| 2013/0336603 | A1 | 12/2013 | Matsunaga et al. | |
| 2022/0080544 | A1 | 3/2022 | Painczyk et al. | |

FOREIGN PATENT DOCUMENTS

| | | | |
|---|---|---|---|
| CN | 111113131 | A | 5/2020 |
| CN | 114178562 | A | 3/2022 |
| CN | 216759130 | U | 6/2022 |
| CN | 115502426 | A | 12/2022 |
| EP | 0 223 913 | A1 | 6/1987 |
| TW | I476331 | B | 3/2015 |
| WO | 03/024663 | A2 | 3/2003 |

OTHER PUBLICATIONS

Weck, M. et al., "Spindle and toolsystems with high damping," Annals of the CIRP, vol. 48, Issue 1, pp. 297-302 (1999).

Zhao, Y. et al., "Simulation of liquid film damping system in machining of precise borehole," Chinese Journal of Mechanical Engineering, vol. 39, Issue 8, pp. 151-154 (Aug. 2003).

Bouzidane, A et al., "Nonlinear Dynamic Behavior of a Rigid Rotor Supported by Hydrostatic Squeeze Film Dampers," Journal of Tribology, vol. 130, Issue 4, pp. 041102-1-041102-9 (Oct. 2008).

Yu, T. et al., "Research of Ultrahigh Speed Grinding Spindle System Based on Squeeze Film Damping Technology," Key Engineering Materials, vol. 389-390, pp. 67-71 (2009).

Yu, T. et al., "Study on the Dynamic Characteristics of Ultrahigh Speed Grinding Spindle Based on Squeeze Film Damping Technology," Key Engineering Materials, vol. 416, pp. 123-126 (2009).

Rokia, B. et al., "Real-time vibration control of rigid rotors using controlled supply pressure hydrostatic squeeze film dampers," Models & Optimisation and Mathematical Analysis Journal, vol. 2, Issue 01, pp. 49-54 (2014).

Qiang, S. et al., "Study on Application of Squeeze Film Damper in Precision Hole Grinding," Journal of Computational and Theoretical Nanoscience, vol. 13, Issue 9, pp. 5867-5871 (2016).

* cited by examiner

SPINDLE DEVICE WITH ADJUSTABLE DAMPING CHARACTERISTICS AND METHOD FOR ADJUSTING DAMPING CHARACTERISTICS THEREOF

CROSS-REFERENCE TO RELATED APPLICATIONS

The present application is based on, and claims priority from, Taiwan Application Serial Number 112138698, filed on Oct. 11, 2023 the disclosure of which is hereby incorporated by reference herein in its entirety.

TECHNICAL FIELD

This disclosure relates to a spindle device having damping characteristics.

BACKGROUND

The use of machine tools is extensive and can be applied to various industries, including metal processing, PCB manufacturing, semiconductor, automotive, aerospace, and ultra-precision machining industries. Machine tools play a crucial role in modern precision manufacturing industries. The spindle is the heart of machine tools, and different types of spindles are required for different industries, including air-bearing spindles, hydrostatic spindles, magnetic bearing spindles, and ball bearing spindles. Generally, ball bearing spindles are still the most widely used spindles. In addition to the advantages of low cost and easy maintenance, the accuracy, rigidity, and speed of ball bearing spindles can meet the needs of most industries. Therefore, more and more hard and brittle material processing also considers using ball bearing spindles.

SUMMARY

One embodiment of the disclosure provides a spindle device with adjustable damping characteristics suitable for a damping fluid to flow therein, and the spindle device with adjustable damping characteristics includes a shaft housing, a spindle, a bearing liner, at least one damping adjustment piston and at least one actuating assembly. The spindle is disposed through the shaft housing and rotatable relative to the shaft housing. The spindle includes a shaft and a bearing component, and the bearing component is disposed around the shaft. The bearing liner is sleeved on the bearing component and has at least one liner conical surface facing away from the bearing component. The liner conical surface is non-parallel to an axial direction of the spindle, a damping chamber is formed between the shaft housing and the bearing liner, and the damping chamber is configured to be filled with the damping fluid. The damping adjustment piston is slidably located within the damping chamber in the axial direction and has a piston conical surface facing the liner conical surface. The piston conical surface is non-parallel to the axial direction, and there is a gap formed between the piston conical surface and the liner conical surface. The actuating assembly is configured to drive the damping adjustment piston to move relative to the bearing liner in the axial direction to adjust a size of the gap.

One embodiment of the disclosure provides a method for adjusting damping characteristics of a spindle device, and the method includes forming a damping chamber between a shaft housing and a bearing liner for a damping fluid to flow therein, filling a gap formed between a piston conical surface of a damping adjustment piston and a liner conical surface of a bearing liner with the damping fluid, and driving the damping adjustment piston to move relative to the bearing liner in an axial direction of a spindle by an actuating assembly to adjust a size of the gap. In addition, the liner conical surface is non-parallel to the axial direction, and the piston conical surface is non-parallel to the axial direction.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
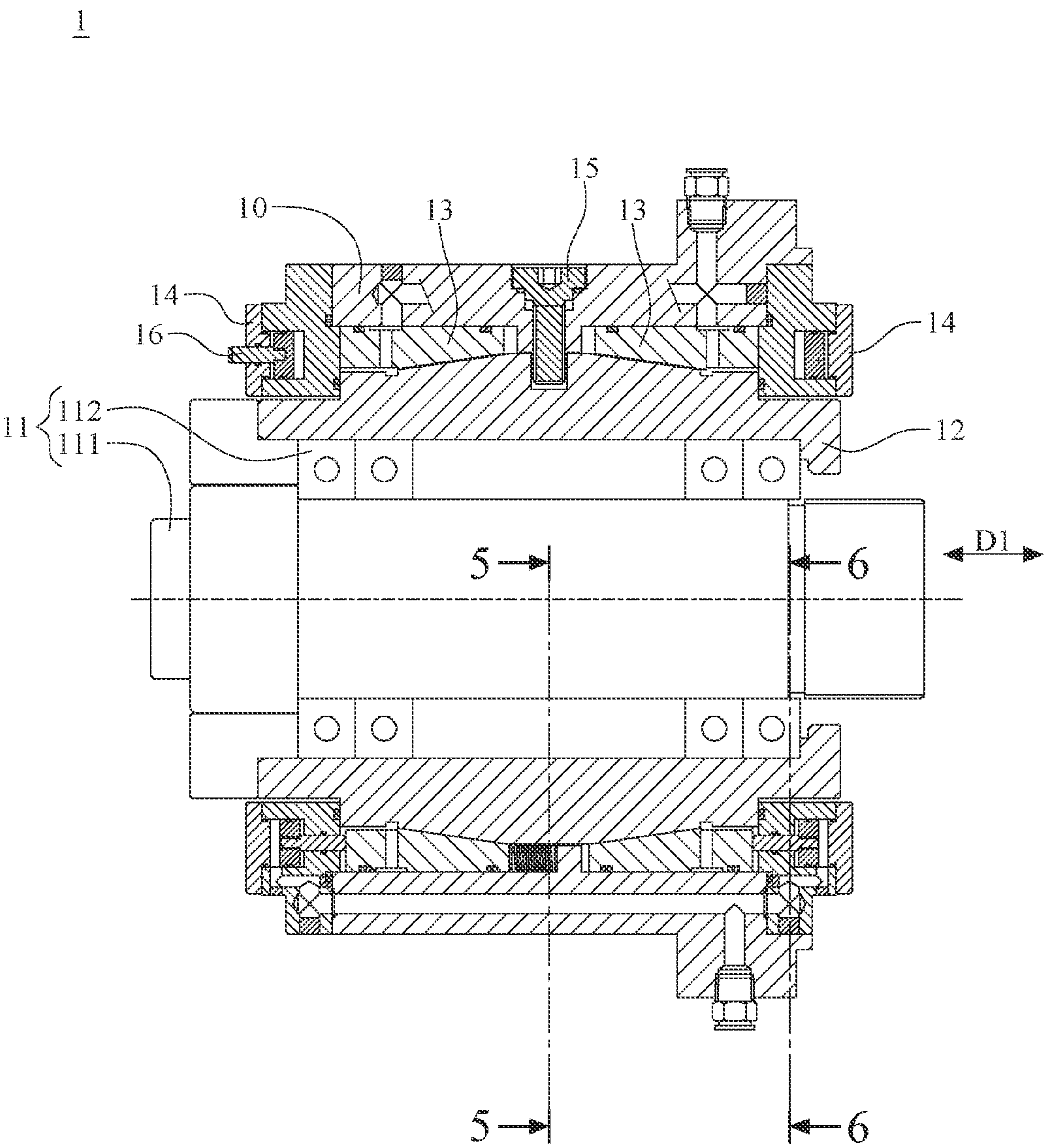
FIG. 1 is a cross-sectional view of a spindle device with adjustable damping characteristics in accordance with the first embodiment of the disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
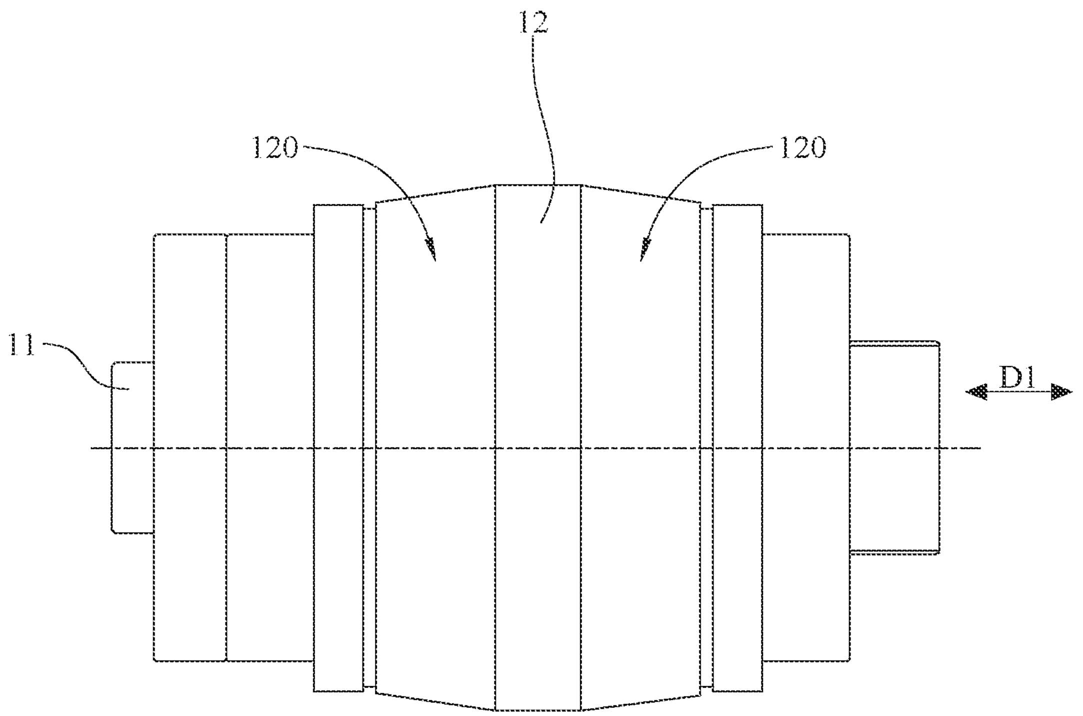
FIG. 2 is a side view of a spindle and a bearing liner of the spindle device with adjustable damping characteristics in FIG. 1.
Figure 3:
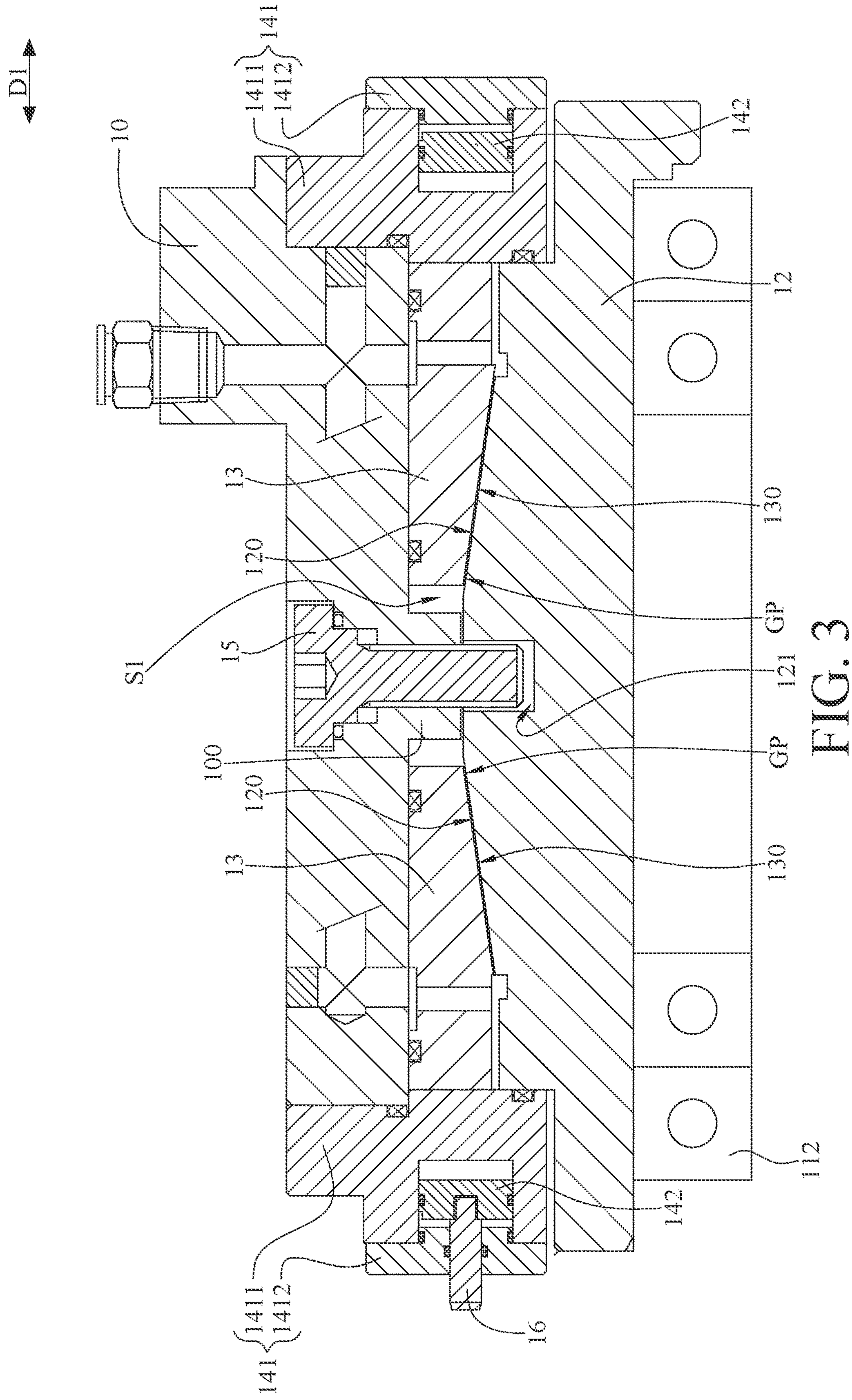
FIG. 3 is a partial enlarged view of the spindle device with adjustable damping characteristics in FIG. 1.
Figure 4:
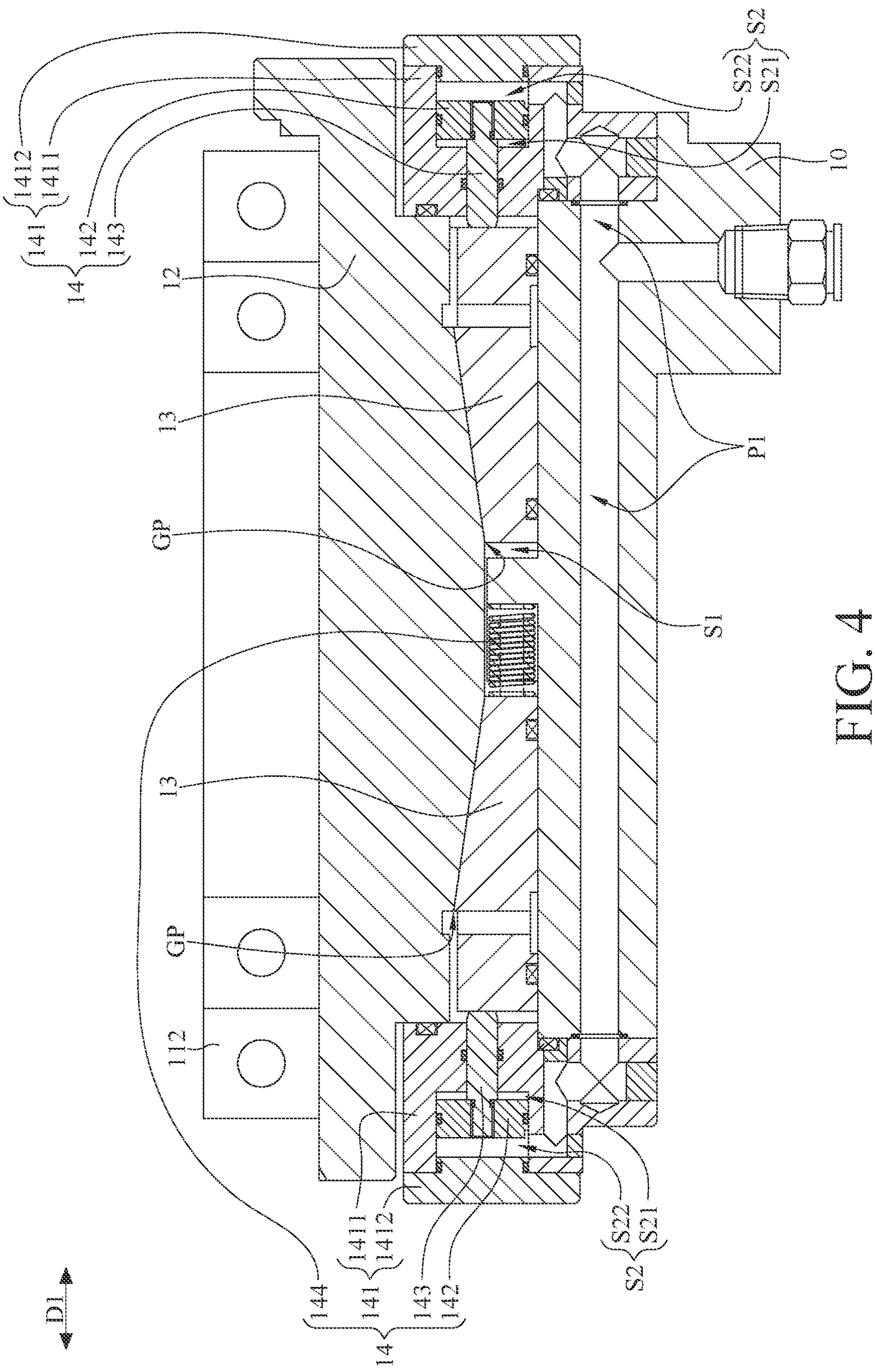
FIG. 4 is another partial enlarged view of the spindle device with adjustable damping characteristics in FIG. 1.

Please refer to FIG. 1 to FIG. 4. FIG. 1 is a cross-sectional view of a spindle device with adjustable damping characteristics in accordance with the first embodiment of the disclosure, FIG. 2 is a side view of a spindle and a bearing liner of the spindle device with adjustable damping characteristics in FIG. 1, FIG. 3 is a partial enlarged view of the spindle device with adjustable damping characteristics in FIG. 1, and FIG. 4 is another partial enlarged view of the spindle device with adjustable damping characteristics in FIG. 1. It is noted that for the convenience of illustrating the structure of the components, the cross-section above and below the axis in FIG. 1 may not be in the same plane, and the present disclosure is not limited to the orientation of the cross-sections.

In this embodiment, a spindle device 1 with adjustable damping characteristics is provided, and the spindle device 1 with adjustable damping characteristics is suitable for a damping fluid (not labeled) to flow therein. The spindle device 1 with adjustable damping characteristics includes a shaft housing 10, a spindle 11, a bearing liner 12, two damping adjustment pistons 13, two actuating assemblies 14, a positioning pin 15, a driving fluid control unit (not shown in figures), a damping fluid adjustment unit (not shown in figures), a gap sensor 16 and a vibration sensor (not shown in figures).

As shown in FIG. 1, the spindle 11 is disposed through the shaft housing 10 and is rotatable relative to the shaft housing 10. In addition, the spindle 11 includes a shaft 111 and a bearing component 112, and the bearing component 112 is disposed around the shaft 111.

The bearing liner 12 is sleeved on the bearing component 112 and, for example, is a ring-shaped component. As shown in FIG. 3, the bearing liner 12 has two liner conical surfaces 120 facing away from the bearing component 112, and the liner conical surfaces 120 are non-parallel to an axial direction D1 of the spindle 11. Additionally, a damping chamber S1 is formed between the shaft housing 10 and the bearing liner 12, as shown in FIG. 4, to accommodate the damping adjustment pistons 13 and configured for the injection and flow of the damping fluid. As shown in FIG. 3, the shaft housing 10 has a flange 100 which is full-circular, and the flange 100 protrudes into the middle of the damping chamber S1. Furthermore, the bearing liner 12 further has a positioning groove 121, and the positioning groove 121 corresponds to the flange 100 of the shaft housing 10.

As shown in FIG. 3, the damping adjustment pistons 13, for example, are ring-shaped components. Both of the damping adjustment pistons 13 are slidable along the axial direction D1 and are respectively located on two opposite sides within the damping chamber S1. In this embodiment, the two damping adjustment pistons 13 are symmetrically arranged, but the present disclosure is not limited thereto. Each of the damping adjustment pistons 13 has a piston conical surface 130, each facing one of the two liner conical surfaces 120 of the bearing liner 12. The piston conical surfaces 130 are non-parallel to the axial direction D1, and there is a gap GP formed between the piston conical surface 130 and the liner conical surface 120 corresponding to each other, as shown in FIG. 3 and FIG. 4. In this embodiment, the liner conical surface 120 is parallel to the piston conical surface 130 corresponding thereto.

In the embodiment shown in FIG. 4, the actuating assemblies 14 are respectively configured to drive the damping adjustment pistons 13 to move along the axial direction D1 relative to the bearing liner 12, thereby individually adjusting the size of the gaps GP. This adjustment influences the behavior of the damping fluid flowing into the gaps GP, thereby altering the damping characteristics. Specifically, each of the two actuating assemblies 14 may include an end-cap hydraulic cylinder 141, a driving piston 142, a plurality of push rods 143, and a plurality of springs 144. The two end-cap hydraulic cylinders 141 are located at two opposite ends of the damping chamber S1 in the axial direction D1, respectively, and each of the end-cap hydraulic cylinders 141 includes a cylinder body 1411 and a cylinder cover 1412. Both of the cylinder bodies 1411 are secured to the shaft housing 10. As shown in FIG. 3 and FIG. 4, the two cylinder bodies 1411, along with the shaft housing 10 and the bearing liner 12, collectively surround the damping chamber S1. Additionally, each of the cylinder bodies 1411 has a storage chamber S2, and the two cylinder covers 1412 are respectively disposed on the two cylinder bodies 1411 and respectively cover the two storage chambers S2. The two driving pistons 142 are slidably disposed within the two storage chambers S2 along the axial direction D1.

As shown in FIG. 4, in each of the actuating assemblies 14, one end of each of the push rods 143 is fixed to the driving piston 142, and another end of each of the push rods 143 is movably disposed through the cylinder body 1411 and presses against one end of the damping adjustment piston 13 corresponding thereto. The springs 144 are located in the damping chamber S1, where one end of each of the springs 144 rests within a spring positioning hole on the flange 100 of the shaft housing 10, and another end of each of the springs 144 presses against another end of the damping adjustment piston 13 corresponding thereto so as to provide a consistent pushing force that assists in the restoration of the damping adjustment piston 13.

Figure 5:
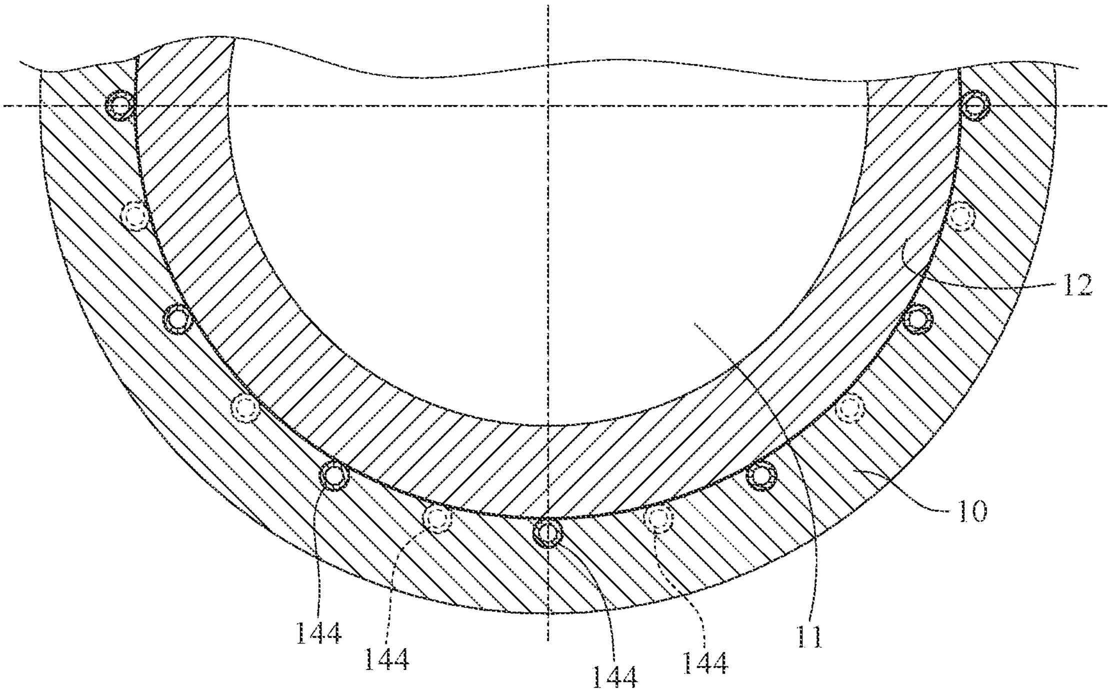
FIG. 5 is a partial cross-sectional view of the spindle device with adjustable damping characteristics along line 5-5 in FIG. 1.
Figure 6:
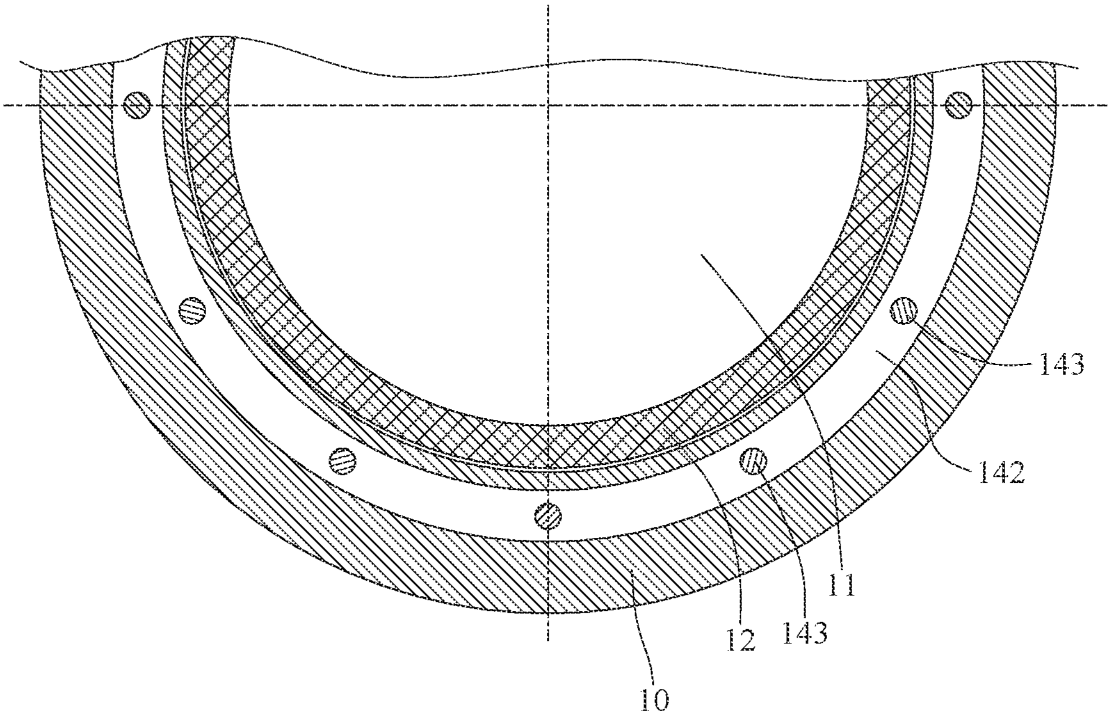
FIG. 6 is a partial cross-sectional view of the spindle device with adjustable damping characteristics along line 6-6 in FIG. 1.

Please refer to FIG. 4, FIG. 5 and FIG. 6. In particular, FIG. 5 is a partial cross-sectional view of the spindle device with adjustable damping characteristics along line 5-5 in FIG. 1, and FIG. 6 is a partial cross-sectional view of the spindle device with adjustable damping characteristics along line 6-6 in FIG. 1. For ease of showing the component structure, FIG. 5 and FIG. 6 illustrate lower-half cross-sectional schematic views of the spindle device at the positions corresponding to the section lines 5-5 and 6-6 in FIG. 1, but not directly sectioning through the sectioned spindle device as shown in FIG. 1.

The springs 144 of each of the actuating assemblies 14 are arranged in a circular configuration around and between the damping adjustment piston 13 corresponding thereto and the shaft housing 10. The push rods 143 of each of the actuating assemblies 14 are arranged in a circular configuration and located on one side of the driving piston 142 corresponding thereto. With this arrangement, the springs 144 and the push rods 143 can evenly apply force to the damping adjustment piston 13 having a circular shape, preventing uneven forces on the damping adjustment piston 13 during movement. It should be noted that in FIG. 5, the springs 144 of the two actuating assemblies 14 are shown in solid and dashed lines, respectively. In this embodiment, the springs 144 of the two actuating assemblies 14 are arranged alternately along the axial direction D1, but the present disclosure is not limited thereto. For example, in other embodiments, the positions of the springs of the two actuating assemblies may overlap each other along the axial direction. Furthermore, although FIG. 5 and FIG. 6 only show the lower half cross-sectional schematic views of the spindle device, as mentioned earlier, in this embodiment, the springs 144 are arranged in a circular configuration around and between the damping adjustment piston 13 corresponding thereto and the shaft housing 10, and the push rods 143 are arranged in a circular configuration and located on one side of the driving piston 142 corresponding thereto, and the present disclosure is not limited thereto.

The driving fluid control unit may be directly or indirectly disposed on the shaft housing 10. As shown in FIG. 4, the shaft housing 10 may have two driving fluid pipelines P1, and two ends of each of the two driving fluid pipelines P1 are connected to the driving fluid control unit and the storage chamber S2 corresponding thereto, respectively. Consequently, the driving fluid control unit can drive a driving fluid (not labeled) to flow into or out of the two storage chambers S2 through the two driving fluid pipelines P1 (please refer temporarily to FIG. 9 and FIG. 10, which illustrate dashed arrows to represent the flow direction of the driving fluid) to force the two driving pistons 142 to move in the axial direction D1, thereby, through the push rods 143 or the springs 144, pushing the two damping adjustment pistons 13 to move in the axial direction D1 for varying the size of the gaps GP.

As shown in FIG. 3, the positioning pin 15 is disposed through the shaft housing 10 to prevent unexpected rotation of the bearing liner 12 (e.g., preventing the bearing liner 12 from being driven by the spindle 11 during the rotation of the spindle 11). In this embodiment, the positioning pin 15 is disposed through the flange 100 of the shaft housing 10 and correspondingly inserted into the positioning groove 121 of the bearing liner 12.

Figure 7:
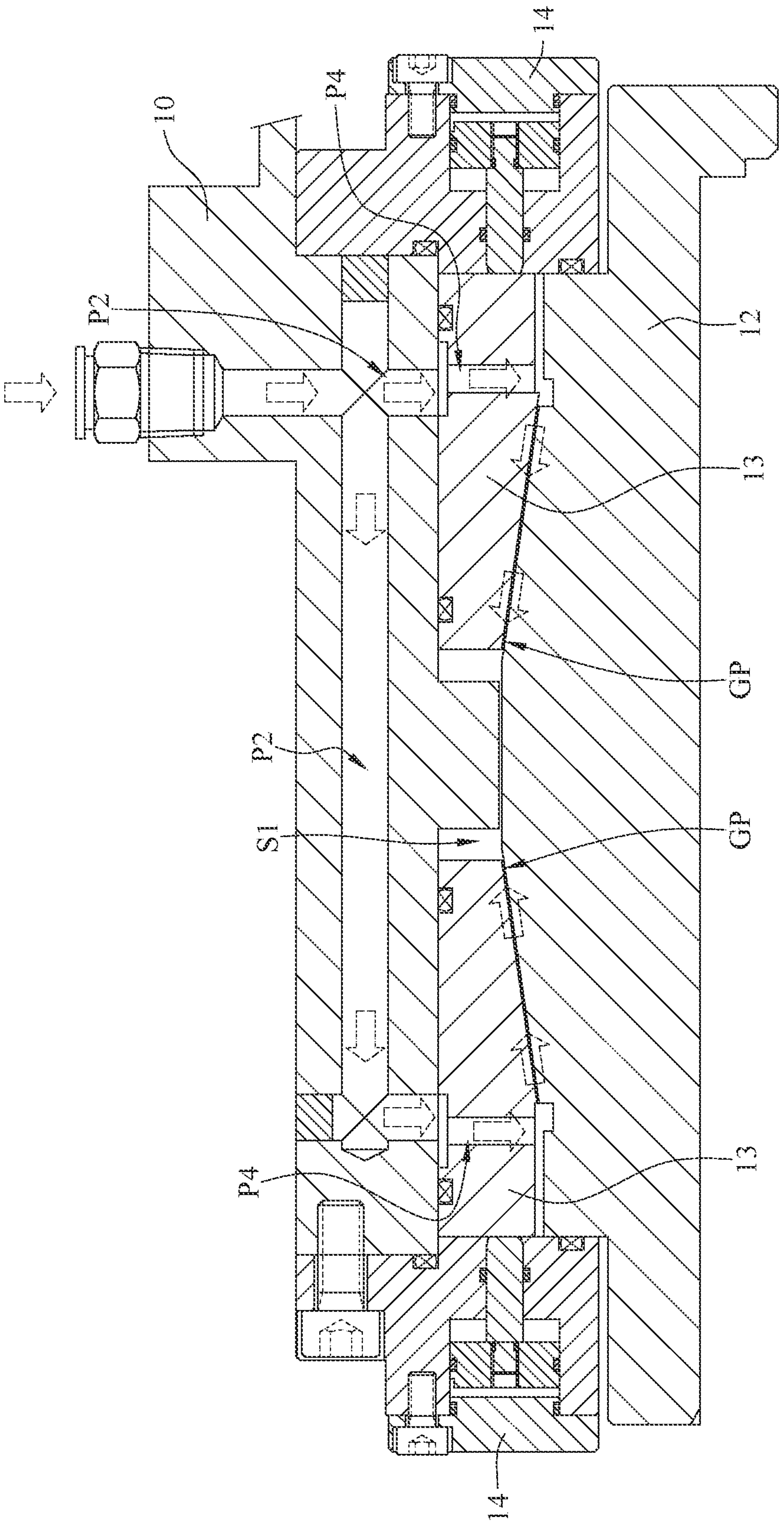
FIG. 7 is another partial cross-sectional view of the spindle device with adjustable damping characteristics in FIG. 1.
Figure 8:
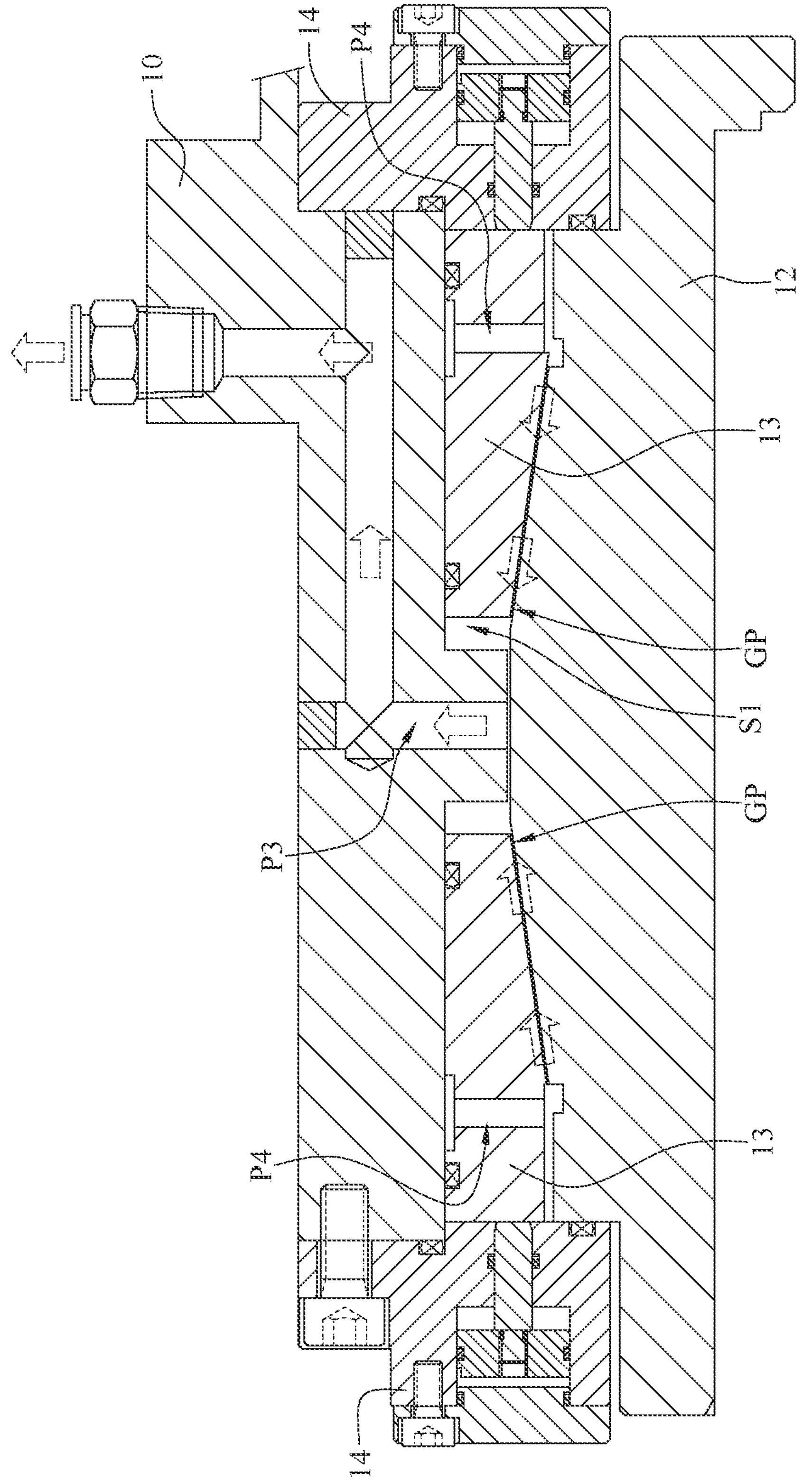
FIG. 8 is another partial cross-sectional view of the spindle device with adjustable damping characteristics in FIG. 1.

Please refer to FIG. 7 and FIG. 8. FIG. 7 is another partial cross-sectional view of the spindle device with adjustable damping characteristics in FIG. 1, and FIG. 8 is another partial cross-sectional view of the spindle device with adjustable damping characteristics in FIG. 1.

The damping fluid adjustment unit may be directly or indirectly disposed on the shaft housing 10. The shaft housing 10 may have two damping inflow pipelines P2 and a damping outflow pipeline P3. One end of each of the two damping inflow pipelines P2 is connected to the damping fluid adjustment unit, and another ends of the two damping inflow pipelines P2 are respectively connected to two opposite sides of the damping chamber S1 (as shown in FIG. 7). Two ends of the damping outflow pipeline P3 are connected to the damping fluid adjustment unit and the middle of the damping chamber S1 (as shown in FIG. 8), respectively. Through the above configuration, the damping fluid adjustment unit, the two damping inflow pipelines P2, the damping chamber S1, and the damping outflow pipeline P3 collectively form a damping fluid loop. Preferably, the damping fluid loop is a closed loop. Moreover, as shown in FIG. 7, each of the two damping adjustment pistons 13 has a connection pipeline P4, and two ends of the connection pipeline P4 are respectively connected to the damping inflow pipeline P2 and the gap GP corresponding thereto.

Please refer to FIG. 7 and FIG. 8 simultaneously. The damping fluid adjustment unit is configured to drive the damping fluid to sequentially flow through the two damping inflow pipelines P2, the damping chamber S1, and the damping outflow pipeline P3, then flow back to the damping fluid adjustment unit, maintaining the flow of the damping fluid in the damping fluid loop (as indicated by dashed arrows in FIG. 7 and FIG. 8 representing the flow direction of the damping fluid). When the damping fluid enters the damping chamber S1, at least a portion of the damping fluid can flow into the two gaps GP through the two connection pipelines P4 of the two damping adjustment pistons 13. Thus, the damping fluid adjustment unit can adjust and control the flow rate and fluid pressure of the damping fluid entering the two gaps GP. In other embodiments of the present disclosure, the damping fluid in the damping fluid loop can be maintained in either a flowing or static state based on practical requirements, and the present disclosure is not limited thereto.

Figure 9:
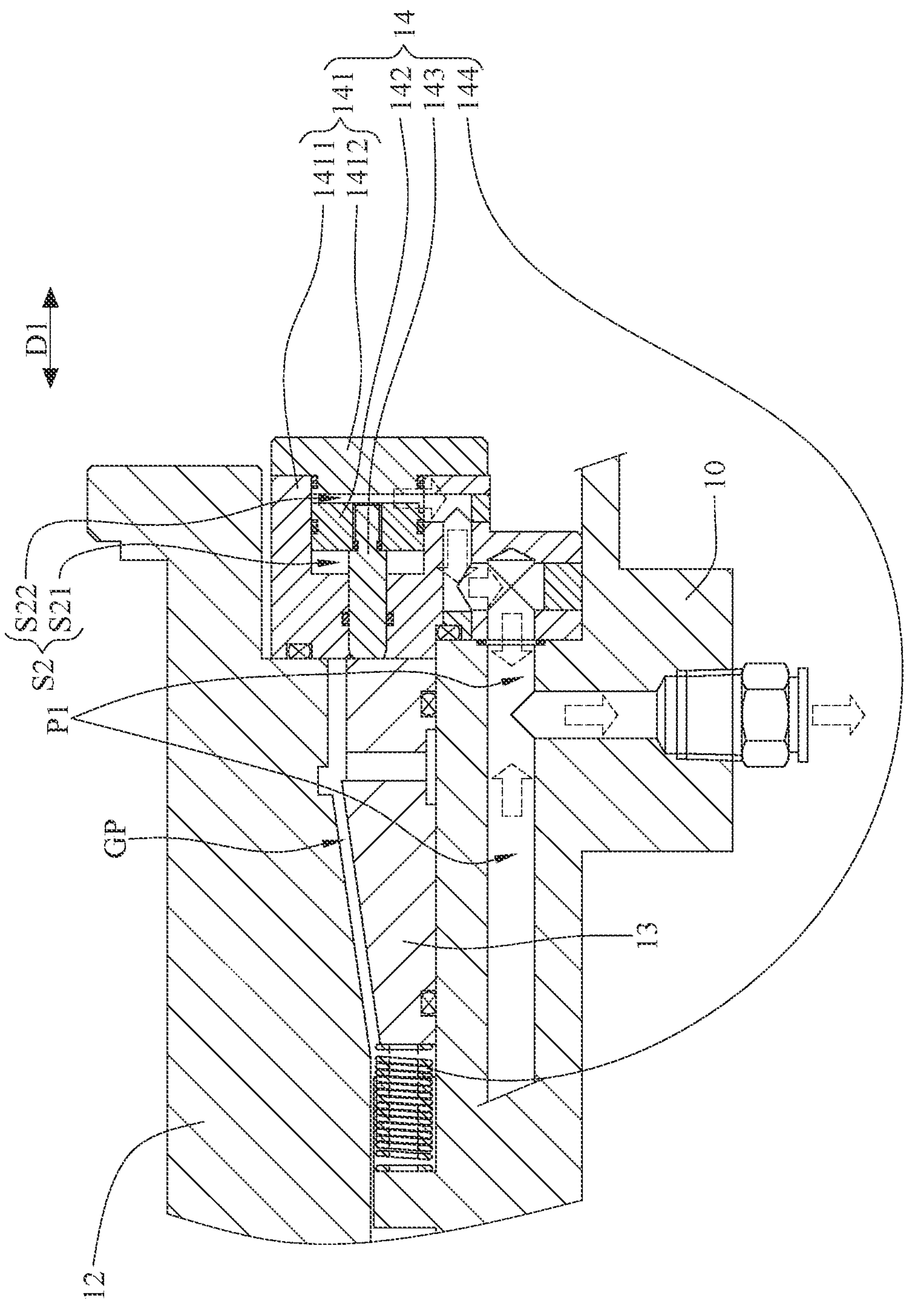
FIG. 9 is a partial cross-sectional view of a larger gap formed between a piston conical surface and a liner conical surface in the spindle device with adjustable damping characteristics in FIG. 1.
Figure 10:
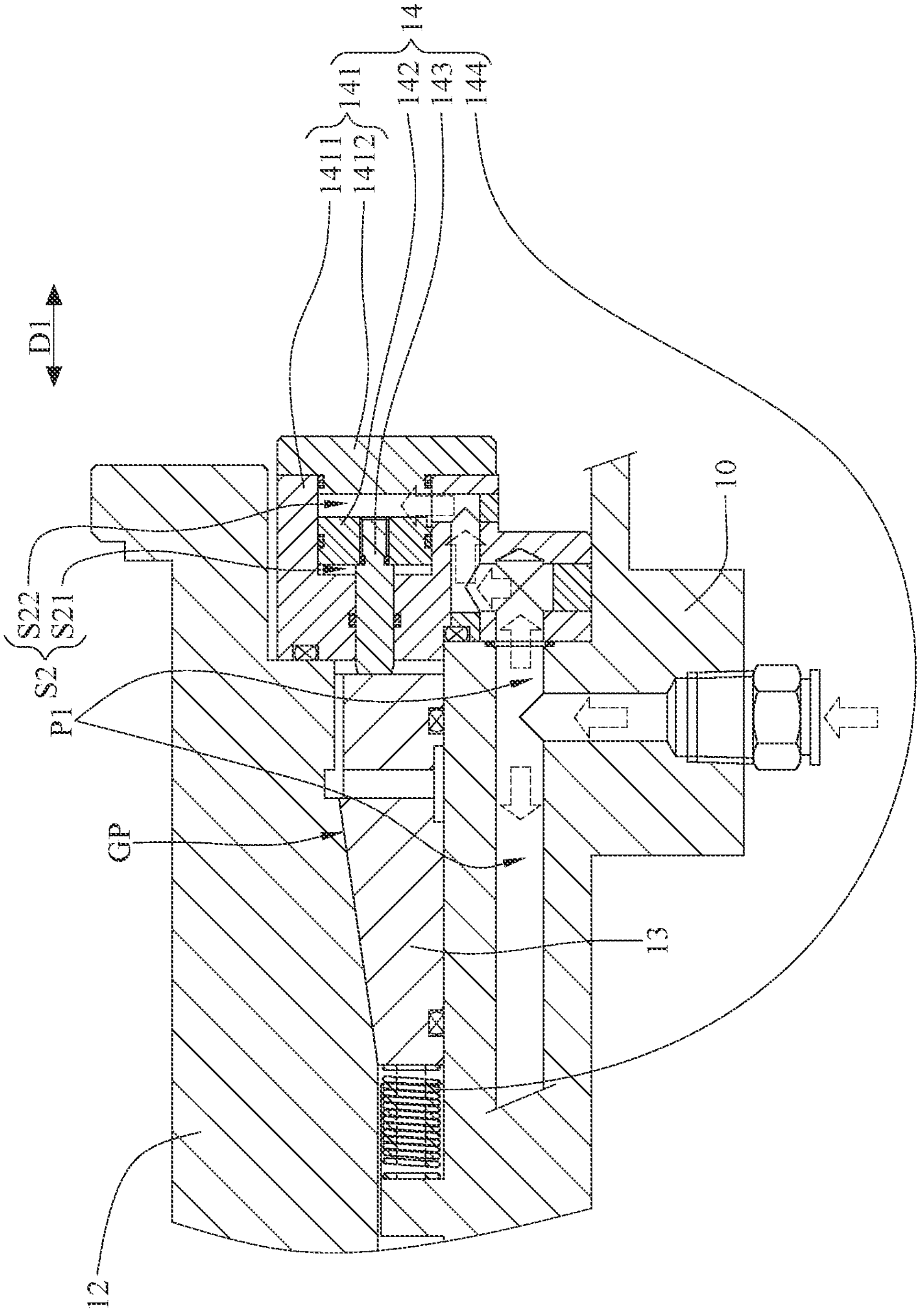
FIG. 10 is a partial cross-sectional view of a smaller gap formed between a piston conical surface and a liner conical surface in the spindle device with adjustable damping characteristics in FIG. 1.

Please refer to FIG. 3, FIG. 4, FIG. 9 and FIG. 10 simultaneously. In particular, FIG. 9 is a partial cross-sectional view of a larger gap formed between a piston conical surface and a liner conical surface in the spindle device with adjustable damping characteristics in FIG. 1, and FIG. 10 is a partial cross-sectional view of a smaller gap formed between a piston conical surface and a liner conical surface in the spindle device with adjustable damping characteristics in FIG. 1.

In each of the actuating assemblies 14, the driving piston 142 separates the storage chamber S2 into an inner chamber S21 and an outer chamber S22, and the outer chamber S22 is located farther away from the damping adjustment piston 13 than the inner chamber S21 to the damping adjustment piston 13. The description below focuses on one set of actuating assembly 14 and its corresponding driving fluid pipeline P1. As shown in FIG. 10, the two ends of the driving fluid pipeline P1 are respectively connected to the driving fluid control unit and the outer chamber S22. The driving fluid control unit can inject the driving fluid into the outer chamber S22 through the driving fluid pipeline P1 of the shaft housing 10. This increases the fluid pressure in the outer chamber S22, surpassing a consistent pushing force applied by the springs 144 to the damping adjustment piston 13. Consequently, the driving piston 142 is pushed, moving towards the damping adjustment piston 13 by the push rods 143. This action propels the damping adjustment piston 13 against the springs 144 until a balance is reached between the fluid pressure and the consistent pushing force, achieving a desired size of the gap GP. Conversely, as shown in FIG. 9, the driving fluid control unit can also extract the driving fluid from the outer chamber S22 through the driving fluid pipeline P1, which reduces the fluid pressure in the outer chamber S22, causing it to fall below the consistent pushing force exerted by the springs 144 on the damping adjustment piston 13. This prompts the springs 144 to push the damping adjustment piston 13 to move towards the push rods 143 until a balance is reached between the fluid pressure and the consistent pushing force, achieving a desired size of the gap GP.

In this embodiment, when the damping adjustment piston 13 moves towards the springs 144 in contact therewith, the gap GP between the liner conical surface 120 and the piston conical surface 130 becomes smaller. Conversely, when the damping adjustment piston 13 moves towards the push rods 143 in contact therewith, the gap GP between the liner conical surface 120 and the piston conical surface 130 becomes larger. In this way, by adjusting the size of the gap GP, the damping values can be varied to address different vibration issues under various cutting conditions (such as speed, depth of cut, feed rate, overhang length, etc.) and different cutting materials. This allows for suited damping characteristics to mitigate vibrations and reduce the impact of vibrations of the spindle. Additionally, the driving fluid may be, for example, a gas or liquid, and the present disclosure is not limited thereto. Moreover, different fluid types can provide different damping values.

As shown in FIG. 3, the gap sensor 16 is, for example, a detecting rod that is disposed on at least one of the actuating assemblies 14. Specifically, the gap sensor 16 may be disposed through the cylinder cover 1412, and one end of the gap sensor 16 is fixed to the driving piston 142 for detecting the size of the gap GP. Therefore, the gap sensor 16 can provide real-time feedback on the size of the gap GP to the driving fluid control unit and/or the damping fluid adjustment unit, thereby enabling immediate and active control of the damping characteristics. However, the inclusion of a gap sensor is optional, and the present disclosure is not limited thereto. In other embodiments, the spindle device with adjustable damping characteristics may not include a gap sensor.

The vibration sensor may be directly or indirectly disposed on the shaft housing 10 to detect the magnitude of vibrations caused by the rotation of the spindle 11. Therefore, the vibration sensor can provide real-time feedback on the detected vibration magnitude to the driving fluid control unit and/or the damping fluid adjustment unit, enabling immediate and active control of damping characteristics. However, the inclusion of a vibration sensor is optional, and the present disclosure is not limited thereto. In other embodiments, the spindle device with adjustable damping characteristics may not include a vibration sensor.

The following example illustrates at least one method for adjusting the damping characteristics of a spindle device with adjustable damping characteristics according to the first embodiment or other embodiments of the present disclosure.

The method for adjusting damping characteristics of a spindle device includes forming a damping chamber S1 between the shaft housing 10 and the bearing liner 12 for the damping fluid to flow therein, filling the gap GP formed between the piston conical surface 130 and the liner conical surface 120 with the damping fluid, and driving the damping adjustment piston 13 to move relative to the bearing liner 12 in the axial direction D1 by the actuating assembly 14 to adjust the size of the gap GP.

Furthermore, selectively, the damping fluid adjustment unit can drive the damping fluid to sequentially flow through the damping inflow pipeline P2, the damping chamber S1 and the gap GP located therein, and the damping outflow pipeline P3 of the shaft housing 10, then return to the damping fluid adjustment unit, enabling the damping fluid to circulate in the damping fluid loop formed by the damping fluid adjustment unit, the damping inflow pipeline P2, the damping chamber S1, and the damping outflow pipeline P3. When it is required to adjust the damping characteristics (damping values) of the spindle device, the flow rate and fluid pressure of the damping fluid flowing into the gap GP can be selectively adjusted through the damping fluid adjustment unit.

In some embodiments, during the step of driving the damping adjustment piston 13 to move along the axial direction D1 relative to the bearing liner 12 through the actuating assembly 14, the driving fluid control unit may drive the driving fluid to flow into or out of the storage chamber S2 through the driving fluid pipeline P1 to force the driving piston 142 to move in the axial direction D1, and subsequently, pushes the damping adjustment piston 13 to move in the axial direction D1 by the push rods 143 or the springs 144 for varying the size of the gap GP.

In some embodiments, the method for adjusting damping characteristics of the spindle device may further include detecting the size of the gap(s) GP by the gap sensor 16. Subsequently, the driving fluid control unit may drive the damping adjustment piston(s) 13 to move relative to the bearing liner 12 in the axial direction D1 for varying the size of the gap(s) GP based on a difference between a predetermined gap size and the size of the gap(s) GP detected by the gap sensor 16.

In some embodiments, the method for adjusting damping characteristics of the spindle device may further include adjusting the flow rate and fluid pressure of the damping fluid flowing in the gap(s) GP by the damping fluid adjustment unit based on the difference between a predetermined gap size and the size of the gap(s) GP detected by the gap sensor 16.

Regarding the predetermined gap, taking a lathe as an example, a first cutting condition is defined as the lathe being used for face milling, while a second cutting condition is defined as the lathe being used for deep-hole boring. The two cutting conditions have distinct characteristics, including tool weight, number of cutting edges, and cutting parameters, resulting in different vibration characteristics. In theory, structural mechanics analysis can be employed to calculate the required dynamic stiffness, and subsequently, fluid mechanics Reynolds equations can be used to estimate the damping gap values. However, when the same dynamic stiffness value is required, the optimal damping values calculated through structural mechanics analysis may vary under different cutting conditions. In other words, the same spindle may exhibit different structural characteristics under different cutting conditions. Therefore, it is necessary to achieve the desired damping values by adjusting the size of the gap to the calculated damping gap value (i.e., the predetermined gap size) to ensure applicability under various cutting situations.

In the first embodiment, the liner conical surface 120 is parallel to the piston conical surface 130 corresponding thereto, but the present disclosure is not limited thereto. For example, please refer to FIG. 11, which is a partial cross-sectional view of a spindle device with adjustable damping characteristics in accordance with the second embodiment of the disclosure. The spindle device with adjustable damping characteristics in this embodiment (corresponding to FIG. 11) is similar to the spindle device 1 with adjustable damping characteristics described in the first embodiment. The same reference numerals indicate the same components, and functions and effects provided by those components are the same as described above, so an explanation in this regard will not be provided again.

Figure 11:
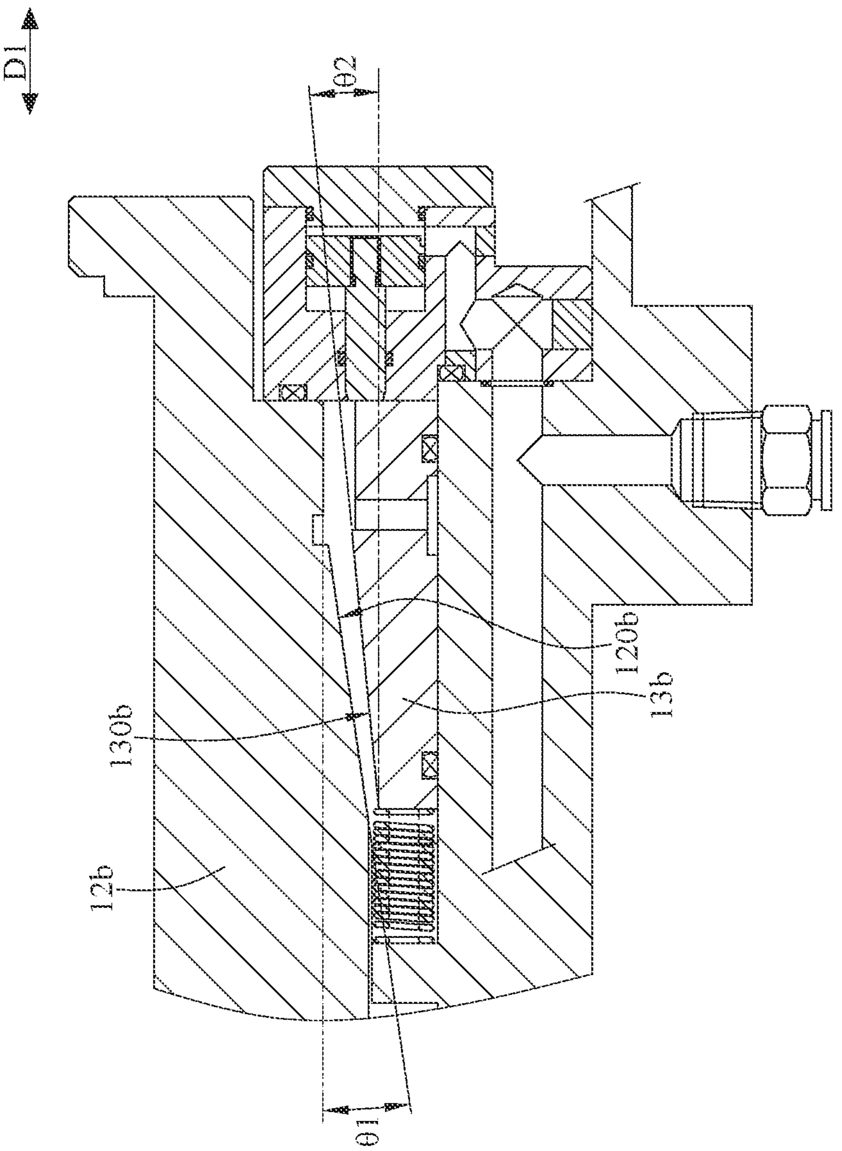
FIG. 11 is a partial cross-sectional view of a spindle device with adjustable damping characteristics in accordance with the second embodiment of the disclosure.

Corresponding to FIG. 11, in this embodiment, a liner conical surface **120*b* of a bearing liner 12*b* is at a first acute angle θ1 to the axial direction D1, and a piston conical surface 130*b* of a damping adjustment piston 13*b* is at a second acute angle θ2 to the axial direction D1, where the first acute angle θ1 is greater than the second acute angle θ2**.

In the first embodiment, each of the conical surfaces 120 is a flat surface, but the present disclosure is not limited thereto. For example, please refer to FIG. 12, which is a side view of a spindle and a bearing liner of a spindle device with adjustable damping characteristics in accordance with the third embodiment of the disclosure. The spindle device with adjustable damping characteristics in this embodiment (corresponding to FIG. 12) is similar to the spindle device 1 with adjustable damping characteristics described in the first embodiment. The same reference numerals indicate the same components, and functions and effects provided by those components are the same as described above, so an explanation in this regard will not be provided again.

Figure 12:
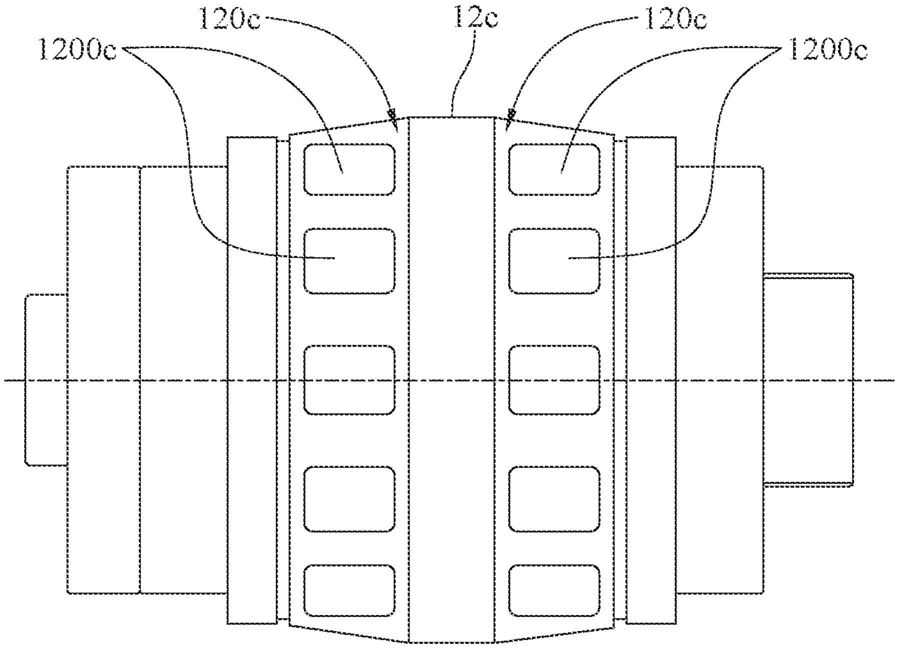
FIG. 12 is a side view of a spindle and a bearing liner of a spindle device with adjustable damping characteristics in accordance with the third embodiment of the disclosure.

Please refer to FIG. 12. In this embodiment, each of two liner conical surfaces **120*c* of a bearing liner 12*c* has a convex-concave structure 1200*c***. However, the present disclosure is not limited thereto. In other embodiments, the convex-concave structure may be alternatively located on a piston conical surface of a damping adjustment piston based on actual design requirements.

Figure 13:
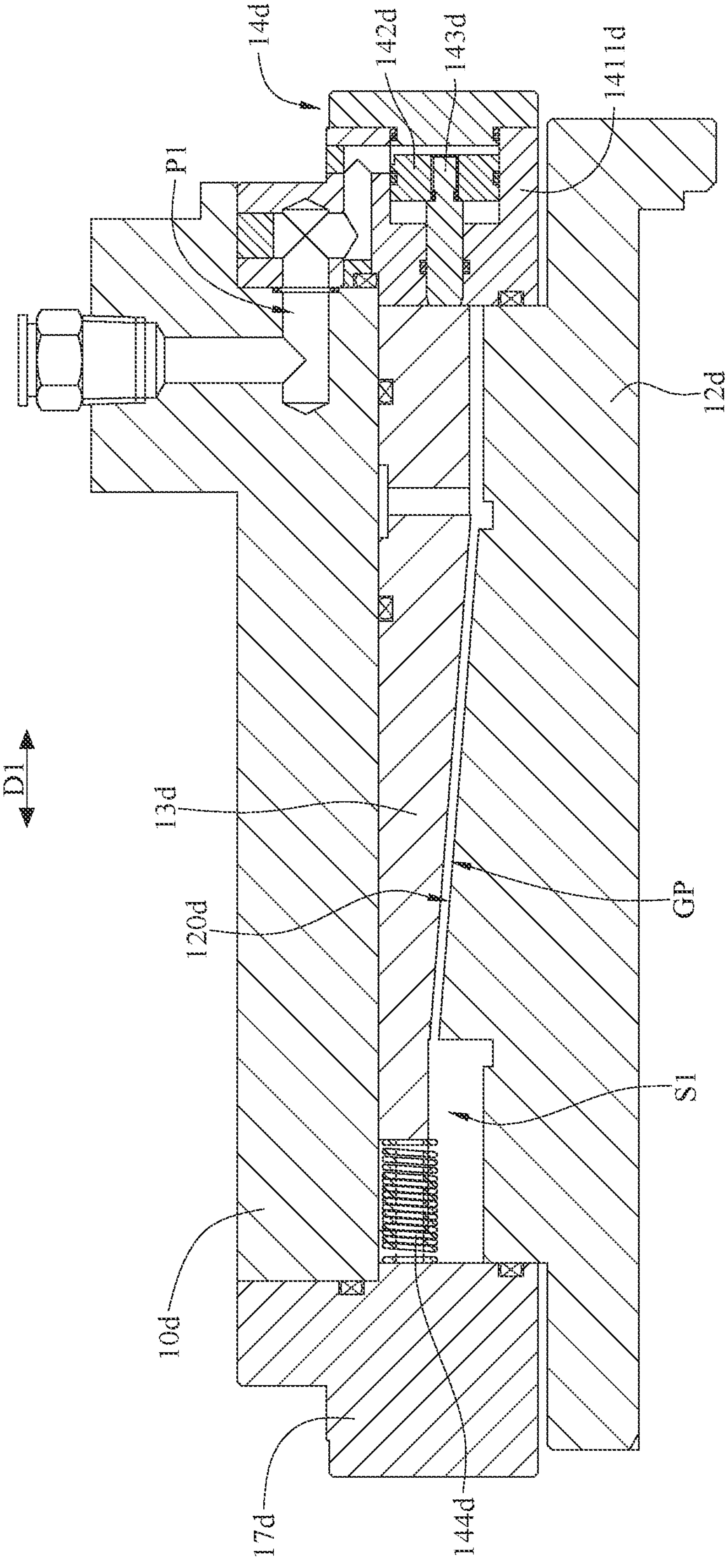
FIG. 13 is a partial cross-sectional view of a spindle device with adjustable damping characteristics in accordance with the fourth embodiment of the disclosure.
Figure 14:
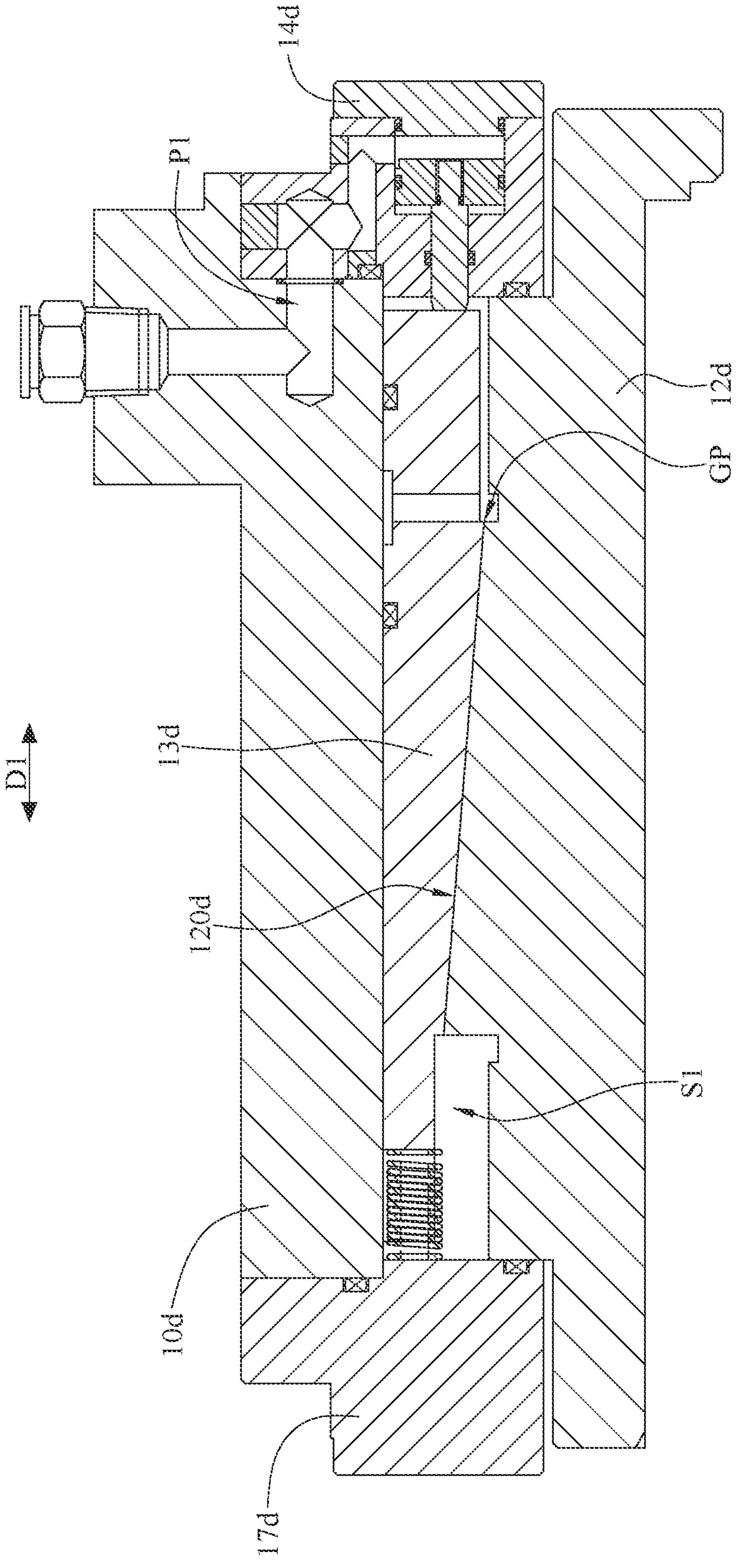
FIG. 14 is a partial cross-sectional view of a smaller gap formed between a piston conical surface and a liner conical surface in the spindle device with adjustable damping characteristics in FIG. 13.
Figure 15:
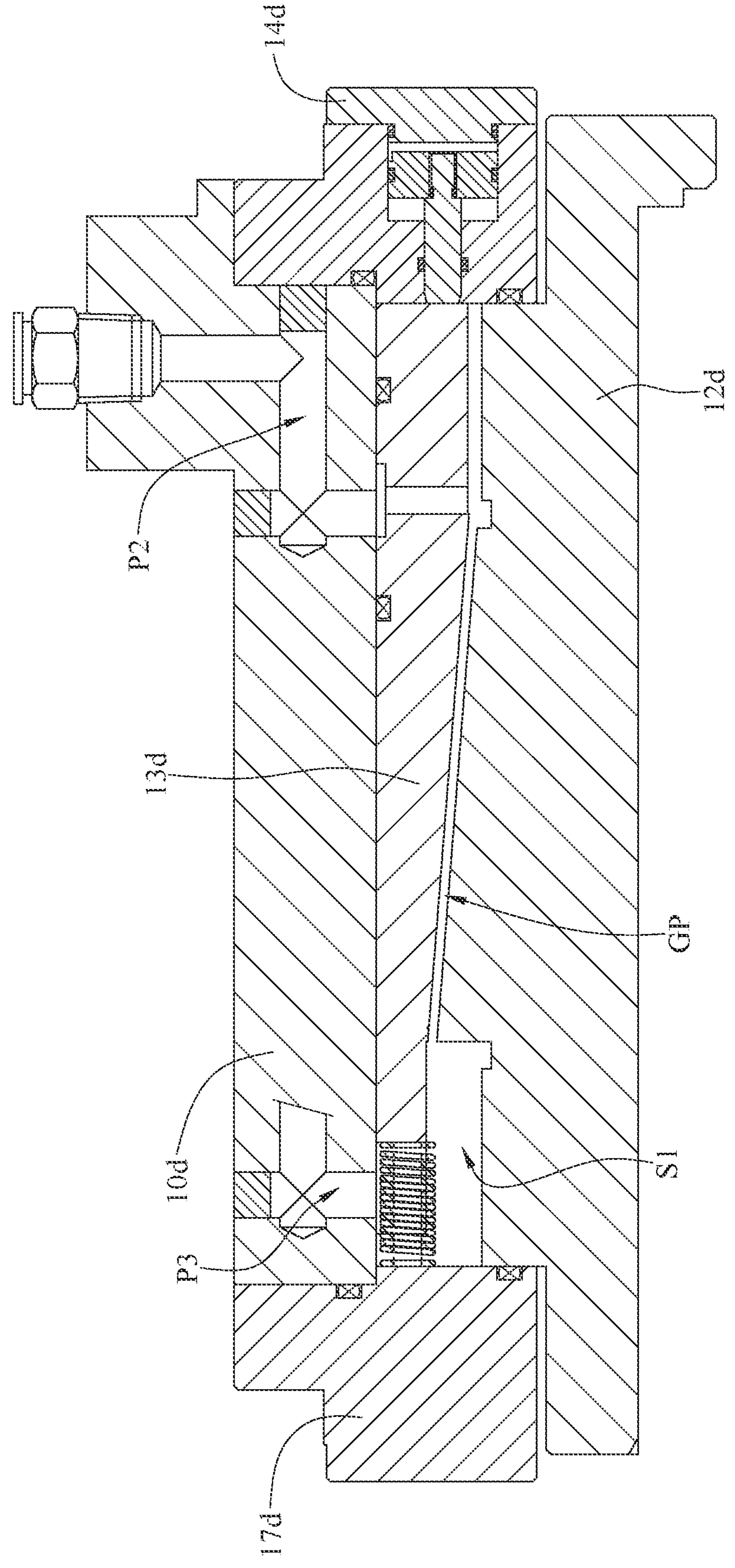
FIG. 15 is another partial cross-sectional view of the spindle device with adjustable damping characteristics in FIG. 13.

In the first embodiment, the quantity of the damping adjustment pistons 13 is two, but the present disclosure is not limited thereto. For example, please refer to FIG. 13 to FIG. 15. FIG. 13 is a partial cross-sectional view of a spindle device with adjustable damping characteristics in accordance with the fourth embodiment of the disclosure, FIG. 14 is a partial cross-sectional view of a smaller gap formed between a piston conical surface and a liner conical surface in the spindle device with adjustable damping characteristics in FIG. 13, and FIG. 15 is another partial cross-sectional view of the spindle device with adjustable damping characteristics in FIG. 13. The spindle device with adjustable damping characteristics in this embodiment (corresponding to FIG. 13) is similar to the spindle device 1 with adjustable damping characteristics described in the first embodiment. The same reference numerals indicate the same components, and functions and effects provided by those components are the same as described above, so an explanation in this regard will not be provided again.

Corresponding to FIG. 13, in this embodiment, the quantity of damping adjustment piston 13*d*, the quantity of liner conical surface 120*d*, the quantity of actuating assembly 14*d*, the quantity of driving fluid pipeline P1 and the quantity of damping inflow pipeline P2 are one. The spindle device with adjustable damping characteristics further includes a sealing component 17*d*. The sealing component 17*d* may, for example, be an end plug.

The sealing component 17*d* and the actuating assembly 14*d* are located at two opposite ends of the damping chamber S1 in the axial direction D1, respectively. The sealing component 17*d* is secured to a shaft housing 10*d* and a bearing liner 12*d*. As a result, the sealing component 17*d*, a cylinder body 1411*d*, the shaft housing 10*d*, and the bearing liner 12*d* collectively surround the damping chamber S1.

One end of each push rod 143*d* is fixed to a driving piston 142*d*, and another end of each push rod 143*d* is movably disposed through the cylinder body 1411*d* and presses against one end of the damping adjustment piston 13*d*. One end of each spring 144*d* presses against the sealing component 17*d*, and another end of each spring 144*d* presses against another end of the damping adjustment piston 13*d*.

In this embodiment, when the damping adjustment piston 13*d* is moved towards the springs 144*d*, the gap GP becomes smaller (as shown in FIG. 14). On the other hand, when the damping adjustment piston 13*d* is moved towards the push rods 143*d*, the gap GP becomes larger (as shown in FIG. 15). Therefore, under various cutting conditions (such as speed, depth of cut, feed rate, overhang length, etc.) and different cutting materials, adjusting the size of the gap GP allows for the adjustment of damping values. This addresses various vibration issues, providing suitable damping characteristics for vibration reduction and, consequently, minimizing the impact of spindle vibrations.

In view of the above description, by driving the damping adjustment piston to move relative to the bearing liner in the axial direction of the spindle through the actuating assembly, the size of the gap formed between the piston conical surface and the liner conical surface is adjusted. This adjustment influences the behavior of the damping fluid within the gap, thereby altering the damping characteristics. In this way, under different cutting conditions and materials, varying the size of the gap to adjust damping values can provide suitable damping characteristics for vibration reduction to address various vibration issues, thus minimizing the impact of spindle vibrations on cutting performance.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A spindle device with adjustable damping characteristics, suitable for a damping fluid to flow therein, comprising:

a shaft housing;

a spindle disposed through the shaft housing and rotatable relative to the shaft housing, the spindle comprising a shaft and a bearing component, and the bearing component disposed around the shaft;

a bearing liner sleeved on the bearing component, the bearing liner having at least one liner conical surface facing away from the bearing component, the at least one liner conical surface being non-parallel to an axial direction of the spindle, a damping chamber formed between the shaft housing and the bearing liner, and the damping chamber configured to be filled with the damping fluid;

at least one damping adjustment piston slidably located within the damping chamber in the axial direction, the at least one damping adjustment piston having a piston conical surface facing the at least one liner conical surface, the piston conical surface being non-parallel to the axial direction, and a gap formed between the piston conical surface and the at least one liner conical surface; and at least one actuating assembly configured to drive the at least one damping adjustment piston to move relative to the bearing liner in the axial direction to adjust a size of the gap.

2. The spindle device with adjustable damping characteristics according to claim 1, wherein the at least one liner conical surface is parallel to the piston conical surface.

3. The spindle device with adjustable damping characteristics according to claim 1, wherein the at least one liner conical surface is at a first acute angle to the axial direction, the piston conical surface is at a second acute angle to the axial direction, and the first acute angle is greater than the second acute angle.

4. The spindle device with adjustable damping characteristics according to claim 1, wherein at least one of the piston conical surface and the at least one liner conical surface has a convex-concave structure.

5. The spindle device with adjustable damping characteristics according to claim 1, further comprising a positioning pin, wherein the positioning pin is disposed through the shaft housing and fixed to the bearing liner.

6. The spindle device with adjustable damping characteristics according to claim 1, further comprising a damping fluid adjustment unit, wherein the shaft housing has a damping inflow pipeline and a damping outflow pipeline, two ends of the damping inflow pipeline are connected to the damping fluid adjustment unit and a side of the damping chamber, respectively, two ends of the damping outflow pipeline are connected to the damping fluid adjustment unit and another side of the damping chamber, respectively, and the damping fluid adjustment unit, the damping inflow pipeline, the damping chamber and the damping outflow pipeline collectively form a damping fluid loop;

wherein the damping fluid adjustment unit is configured to drive the damping fluid to sequentially flow through the damping inflow pipeline, the damping chamber and the damping outflow pipeline, and then flow back to the damping fluid adjustment unit, and the damping fluid adjustment unit is configured to adjust a flow rate and a fluid pressure of the damping fluid flowing in the gap.

7. The spindle device with adjustable damping characteristics according to claim 6, wherein the at least one damping adjustment piston has a connection pipeline, and two ends of the connection pipeline are connected to the damping inflow pipeline and the gap, respectively.

8. The spindle device with adjustable damping characteristics according to claim 1, further comprising a sealing component and a driving fluid control unit, wherein a quantity of the at least one damping adjustment piston, a quantity of the at least one liner conical surface and a quantity of the at least one actuating assembly are one, the sealing component and the actuating assembly are located at two opposite ends of the damping chamber in the axial direction, respectively, and the sealing component and the actuating assembly are secured to the shaft housing and the bearing liner.

9. The spindle device with adjustable damping characteristics according to claim 8, wherein the actuating assembly comprises:

an end-cap hydraulic cylinder comprising a cylinder body and a cylinder cover, the cylinder body secured to the shaft housing and the bearing liner, the cylinder body having a storage chamber, and the cylinder cover disposed on the cylinder body and covering the storage chamber;

a driving piston slidably disposed in the storage chamber along the axial direction;

at least one push rod, wherein an end of the at least one push rod is fixed to the driving piston, and another end of the at least one push rod is movably disposed through the cylinder body and presses against an end of the damping adjustment piston; and at least one spring located in the damping chamber, and the at least one spring pressing against the damping adjustment piston so as to provide a consistent pushing force that assists in restoration of the damping adjustment piston;

wherein the shaft housing has a driving fluid pipeline, two ends of the driving fluid pipeline are connected to the driving fluid control unit and the storage chamber, respectively, the driving fluid control unit is configured to drive a driving fluid to flow into or out of the storage chamber through the driving fluid pipeline to force the driving piston to move in the axial direction, thereby pushing the damping adjustment piston to move in the axial direction by the at least one push rod or the at least one spring for varying the size of the gap.

10. The spindle device with adjustable damping characteristics according to claim 9, wherein the at least one push rod comprises a plurality of push rods, the at least one spring comprises a plurality of springs, the plurality of push rods surround the driving piston, and the plurality of springs are arranged in a circular configuration and located on one side of the damping adjustment piston.

11. The spindle device with adjustable damping characteristics according to claim 1, further comprising a driving fluid control unit, wherein the at least one damping adjustment piston comprises two damping adjustment pistons, the at least one liner conical surface comprises two liner conical surfaces, the at least one actuating assembly comprises two actuating assemblies, the two piston conical surfaces of the two damping adjustment pistons face the two liner conical surfaces, respectively, the two damping adjustment pistons are located at two opposite sides of the damping chamber, respectively, the two actuating assemblies are configured to drive the two damping adjustment pistons to move relative to the bearing liner in the axial direction, respectively, the two actuating assemblies are located at two opposite ends of the damping chamber in the axial direction, respectively, and the two actuating assemblies are secured to the shaft housing and the bearing liner.

12. The spindle device with adjustable damping characteristics according to claim 11, wherein each of the two actuating assemblies comprises:

an end-cap hydraulic cylinder comprising a cylinder body and a cylinder cover, the cylinder body secured to the shaft housing and the bearing liner, the cylinder body having a storage chamber, and the cylinder cover disposed on the cylinder body and covering the storage chamber;

a driving piston slidably disposed in the storage chamber along the axial direction;

at least one push rod, wherein an end of the at least one push rod is fixed to the driving piston, and another end of the at least one push rod is movably disposed through the cylinder body and presses against an end of one of the two damping adjustment pistons; and at least one spring located in the damping chamber, and the at least one spring pressing against the one of the two damping adjustment pistons so as to provide a consistent pushing force that assists in restoration of the one of the two damping adjustment pistons;

wherein the shaft housing has a driving fluid pipeline, two ends of the driving fluid pipeline are connected to the driving fluid control unit and the storage chamber, respectively, the driving fluid control unit is configured to drive a driving fluid to flow into or out of the storage chamber through the driving fluid pipeline to force the driving piston to move in the axial direction, thereby pushing the one of the two damping adjustment pistons to move in the axial direction by the at least one push rod or the at least one spring for varying the size of the gap.

13. The spindle device with adjustable damping characteristics according to claim 12, wherein the at least one push rod comprises a plurality of push rods, the at least one spring comprises a plurality of springs, the plurality of push rods surround the driving piston, and the plurality of springs are arranged in a circular configuration and located on one side of the one of the two damping adjustment pistons.

14. The spindle device with adjustable damping characteristics according to claim 1, further comprising a gap sensor, wherein the gap sensor is disposed on the at least one actuating assembly, and the gap sensor is configured to detect the size of the gap.

15. The spindle device with adjustable damping characteristics according to claim 1, further comprising a vibration sensor, wherein the vibration sensor is disposed on the shaft housing, and the vibration sensor is configured to detect a vibration generated due to a rotation of the spindle.

16. A method for adjusting damping characteristics of a spindle device the spindle device according to claim 1, comprising:

forming the damping chamber between the shaft housing and the bearing liner for a damping fluid to flow therein, and filling the gap formed between the piston conical surface of the at least one damping adjustment piston and the at least one liner conical surface of the bearing liner with the damping fluid, wherein the liner conical surface is non-parallel to an axial direction of a spindle, and the piston conical surface is non parallel to the axial direction; and driving the at least one damping adjustment piston to move relative to the bearing liner in the axial direction by the at least one actuating assembly to adjust the size of the gap.

17. The method according to claim 16, further comprising adjusting a flow rate and a fluid pressure of the damping fluid flowing in the gap by a damping fluid adjustment unit.

18. The method according to claim 16, wherein the step of driving the at least one damping adjustment piston to move relative to the bearing liner in the axial direction through the at least one actuating assembly comprises:

driving a driving fluid to flow into or out of a storage chamber, in which a driving piston is accommodated, through a driving fluid pipeline of the shaft housing by a driving fluid control unit to force the driving piston to move in the axial direction, thereby pushing the at least one damping adjustment piston to move in the axial direction by at least one push rod or at least one spring for varying the size of the gap.

19. The method according to claim 16, further comprising:

detecting the size of the gap by a gap sensor; and driving the at least one damping adjustment piston to move relative to the bearing liner in the axial direction for varying the size of the gap by a driving fluid control unit based on a difference between a predetermined gap size and the size of the gap detected by the gap sensor.

20. The method according to claim 16, further comprising:

detecting the size of the gap by a gap sensor; and adjusting a flow rate and a fluid pressure of the damping fluid flowing in the gap by a damping fluid adjustment unit based on a difference between a predetermined gap size and the size of the gap detected by the gap sensor.

* * * * *